(12) United States Patent
Cordoba et al.

(10) Patent No.: US 7,382,177 B2
(45) Date of Patent: Jun. 3, 2008

(54) VOLTAGE CHARGE PUMP AND METHOD OF OPERATING THE SAME

(75) Inventors: Michael Cordoba, Boise, ID (US); Hal Butler, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 215 days.

(21) Appl. No.: 10/972,544

(22) Filed: Oct. 25, 2004

(65) Prior Publication Data

US 2006/0087365 A1   Apr. 27, 2006

(51) Int. Cl.
*G05F 3/02* (2006.01)

(52) U.S. Cl. .......................... 327/536; 363/60

(58) Field of Classification Search ............... 327/530, 327/535–537; 363/59–60
See application file for complete search history.

(56) References Cited

U.S. PATENT DOCUMENTS

| | | | |
|---|---|---|---|
| 5,347,171 A * | 9/1994 | Cordoba et al. ............ 327/536 |
| 5,394,365 A * | 2/1995 | Tsukikawa ............. 365/189.09 |
| 5,444,362 A * | 8/1995 | Chung et al. ............... 323/313 |
| 5,740,109 A | 4/1998 | Morton et al. |
| 5,748,032 A * | 5/1998 | Baek .......................... 327/536 |
| 5,811,990 A | 9/1998 | Blodgett et al. |
| 5,901,055 A * | 5/1999 | Yi et al. ......................... 363/60 |
| 5,973,979 A | 10/1999 | Chang et al. ................ 365/226 |
| 6,166,585 A * | 12/2000 | Bazzani ....................... 327/536 |
| 6,166,960 A * | 12/2000 | Marneweck et al. ... 365/185.28 |
| 6,175,264 B1 * | 1/2001 | Jinbo ......................... 327/536 |
| 6,229,381 B1 | 5/2001 | Keeth |
| 6,240,025 B1 * | 5/2001 | Park ........................... 327/536 |
| 6,316,985 B1 | 11/2001 | Kobayashi et al. |
| 6,498,527 B2 * | 12/2002 | Matsumoto ................. 327/536 |
| 6,621,326 B1 * | 9/2003 | Le ............................... 327/536 |
| 6,657,478 B2 * | 12/2003 | Matsumoto ................. 327/536 |
| 6,734,717 B2 * | 5/2004 | Min ........................... 327/536 |
| 6,914,791 B1 * | 7/2005 | Park et al. .................... 363/60 |
| 6,954,386 B2 * | 10/2005 | Narui et al. ........... 365/189.11 |
| 6,965,263 B2 * | 11/2005 | Bringivijayaraghavan .. 327/537 |
| 2002/0033731 A1 * | 3/2002 | Lee et al .................... 327/536 |
| 2002/0084828 A1 * | 7/2002 | Li ............................... 327/536 |
| 2004/0196095 A1 * | 10/2004 | Nonaka ....................... 327/536 |

* cited by examiner

*Primary Examiner*—N. Drew Richards
*Assistant Examiner*—Thomas J Hiltunen
(74) *Attorney, Agent, or Firm*—Jones Day; Edward L. Pencoske

(57) ABSTRACT

A voltage pump comprising a charging transistor responsive to a first control signal, the charging transistor operable to connect a node to a first voltage, a pumping capacitor responsive to a second control signal, the pumping capacitor operable to pump additional charge the node, and a pumping transistor responsive to a third control signal, the pumping transistor operable to connect the node to an output, wherein the charging transistor, the pumping capacitor, and the pumping transistor are thin-gate transistors. A method comprising charging a node to a first voltage, boosting the node to a second voltage, and connecting the node to an output, wherein the absolute value of the gate-to-source, gate-to-drain, and drain-to-source voltages of the plurality of thin-gate transistors does not exceed the absolute value of a supply voltage. Because of the rules governing abstracts, this abstract should not be used to construe the claims.

20 Claims, 15 Drawing Sheets

VOLTAGE CHARGE PUMP AND METHOD OF OPERATING THE SAME

BACKGROUND

The present invention relates generally to a voltage charge pump and more particularly to a voltage charge pump for use in integrated circuits, among others.

Integrated circuits, such as a dynamic random access memory device (DRAM), typically employ one or more voltage pumps which are used to create voltages that are more positive or more negative than the available supply voltages. A DRAM may use two types of voltage pumps. The first type is a $V_{ccp}$ pump which generates a positive voltage that is used by the DRAM, for example, as a boosted wordline voltage. The second type is a $V_{bb}$ pump (or back-bias voltage pump) which generates a negative voltage that is used, for example, to negatively bias the DRAM's substrate.

Charge pumps typically use voltages that exceed |Vcc| and thus require specialized transistors. For example, $V_{bb}$ pumps typically use high voltages (e.g., greater than |Vcc|) to pump the substrate to a negative voltage. Thus, $V_{bb}$ pumps require the use of specialized transistors having a thick-gate oxide (e.g., approximately 50-60 Å) and/or a unique doping profile. The thick-gate oxide and unique doping profile help to prevent breakdown and punch-through (among others) when the transistors are subjected to the high voltages. These specialized transistors may be referred to as "thick-gate oxide transistors" and/or "thick-gate transistors". FIG. 16 illustrates a prior art $V_{bb}$ pump utilizing thick-gate transistors. The thick-gate transistors are required because, in certain instances, the absolute value of the drain-to-source voltage ($|V_{DS}|$) may exceed $V_{CC}$ (i.e., which causes the breakdown and punch-through as discussed above).

Thick-gate transistors, however, have certain performance shortcomings as compared to thin-gate transistors (the use herein of the terms "thin-gate oxide transistor" and/or "thin-gate transistors" refers to common transistors, for example, transistors having an gate oxide thickness of approximately 25-30 Å and/or having a common doping profile). For example, thick-gate transistors typically pass less current than a thin-gate transistor having a similarly-sized channel width. Thus to charge a capacitor in an equivalent amount of time as the thin-gate transistor, the channel width of the thick-gate transistor must be increased to allow more current to flow. Additionally, the threshold voltage (i.e., Vt) of a thick-gate transistor is higher than that of the thin-gate transistor. Thus, thick-gate transistors require more die space and consume more power during normal operation than an equivalent performing thin-gate transistor.

Several attempts have been made to use thin-gate transistors for pump circuits. FIGS. 17 and 18 illustrate a single stage prior art $V_{ccp}$ pump and a single stage prior art $V_{bb}$ pump, respectively. Referring to the $V_{CCP}$ pump in FIG. 17, signals PH1 and PH2 are non-overlapping active-low clock signals which are operated such that the gate-to-source voltage ($V_{GS}$), the gate-to-drain ($V_{GD}$), and the drain-to-source voltage ($V_{DS}$) of transistors M2 and M4 do not exceed $V_{CC}$. Additionally, signals PH1 and PH2 also prevent the absolute value of the gate-to-source voltage ($|V_{GS}|$) and the absolute value of the gate-to-drain ($|V_{GD}|$) of transistors M1, M3, M5, and M6 from exceeding $V_{CC}$, and further prevent the absolute value of the drain-to-source voltage ($|V_{DS}|$) of transistors M1 and M3 from exceeding $V_{CC}$. Thus, thin-gate transistors may be used in the single stage $V_{ccp}$ pump illustrated in FIG. 17. However, when PH1 (PH2) goes low, PMPN (PMPN2) may briefly transition below $V_{CC}$ thereby causing charge injection within transistors M2 and M4.

Referring to the single stage $V_{bb}$ pump in FIG. 18, signals PH1 and PH2 are non-overlapping active-high clock signals which are operated such that the gate-to-source voltage ($V_{GS}$), the gate-to-drain ($V_{GD}$), and the drain-to-source voltage ($V_{DS}$) of transistors M2 and M4 do not exceed $V_{CC}$. Additionally, signals PH1 and PH2 also prevent the absolute value of the gate-to-source voltage ($|V_{GS}|$) and the absolute value of the gate-to-drain ($|V_{GD}|$) of transistors M1, M3, M5, and M6 from exceeding $V_{CC}$, and further prevent the absolute value of the drain-to-source voltage ($|V_{DS}|$) of transistors M1 and M3 from exceeding $V_{CC}$. Thus, thin-gate transistors may be used in the single stage $V_{bb}$ pump illustrated in FIG. 18. However, when PH1 (PH2) goes high, PMPN (PMPN2) may briefly transition above $V_{SS}$ thereby causing charge injection within transistors M1, M3, M5, and M6.

Accordingly, a need exists for a voltage pump that utilizes thin-gate transistors, increases the pumping capacity/efficiency of the voltage pump, and overcomes the limitations inherent in prior art.

SUMMARY

One aspect of the invention relates to a method for operating a voltage pump having a plurality of transistors comprising charging a node to a first voltage, boosting the node to a second voltage and connecting the node to an output, wherein the absolute value of the gate-to-source, gate-to-drain, and drain-to-source voltages of the plurality of transistors does not exceed the absolute value of a supply voltage during the charging, boosting, and connecting.

Another aspect of the invention relates to a method for operating a voltage pump having a plurality of transistors, comprising charging a node to a first voltage, boosting the node to a second voltage, connecting the node to an output, wherein the absolute value of the gate-to-source, gate-to-drain, and drain-to-source voltages of the plurality of transistors does not exceed the absolute value of a supply voltage during the charging, boosting, and connecting, and preventing a second node from exceeding the voltage of a start-up transistor by more than a threshold voltage.

Another aspect of the invention relates to a voltage pump comprising a charging transistor responsive to a first control signal, the charging transistor operable to connect a node to a first voltage, a pumping capacitor responsive to a second control signal, the pumping capacitor operable to pump additional charge the node, and a pumping transistor responsive to a third control signal, the pumping transistor operable to connect the node to an output, wherein the charging transistor, the pumping capacitor, and the pumping transistor are thin-gate transistors.

Another aspect of the invention relates to a voltage pump comprising a charging transistor responsive to a first control signal, the charging transistor operable to connect a node to a first voltage, a pumping capacitor responsive to a second control signal, the pumping capacitor operable to pump additional charge the node, and a pumping transistor responsive to a third control signal, the pumping transistor operable to connect the node to an output, wherein the absolute value of the gate-to-source, gate-to-drain, and drain-to-source voltages of the charging transistor, the pumping capacitor, and the pumping transistor do not exceed the absolute value of a supply voltage during the charging, boosting, and connecting.

Another aspect of the invention relates to a memory device comprising a memory array having a plurality of memory cells, a plurality of peripheral devices for reading data out of and writing data into the memory array, and a voltage pump, the voltage pump comprising, a charging transistor responsive to a first control signal, the charging transistor operable to connect a node to a first voltage, a pumping capacitor responsive to a second control signal, the pumping capacitor operable to pump additional charge the node, and a pumping transistor responsive to a third control signal, the pumping transistor operable to connect the node to an output, wherein the charging transistor, the pumping capacitor, and the pumping transistor are thin-gate transistors.

Another aspect of the invention relates to a method for operating a voltage pump, comprising activating a charging transistor to drive a node to a first voltage, wherein the charging transistor is a thin-gate transistor, deactivating the charging transistor, activating a pumping capacitor to drive the node to a second voltage, wherein the charging transistor includes a thin-gate transistor, deactivating the pumping capacitor, activating a pumping transistor to connect an output to the node, wherein the pumping transistor is a thin-gate transistor, and deactivating the pumping transistor.

Another aspect of the invention relates to a method for operating a voltage pump, comprising, activating a charging transistor to drive a node to a first voltage, wherein the charging transistor is a thin-gate transistor, deactivating the charging transistor, activating a pumping capacitor to drive the node to a second voltage, wherein the charging transistor includes a thin-gate transistor, deactivating the pumping capacitor, activating a pumping transistor to connect an output to the node, wherein the pumping transistor is a thin-gate transistor, deactivating the pumping transistor, and preventing a second node from exceeding the voltage of a start-up transistor by more than a threshold voltage.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION

The detailed description sets forth specific embodiments which are described in sufficient detail to enable those skilled in the art to practice the present invention. It should be apparent to those skilled in the art that other embodiments may be utilized, and that logical, mechanical, and electrical changes may be made, while remaining within the scope of the present invention. The following detailed description is, therefore, not to be taken in a limiting sense, and the scope of the invention is defined only by the appended claims.

Figure 1:
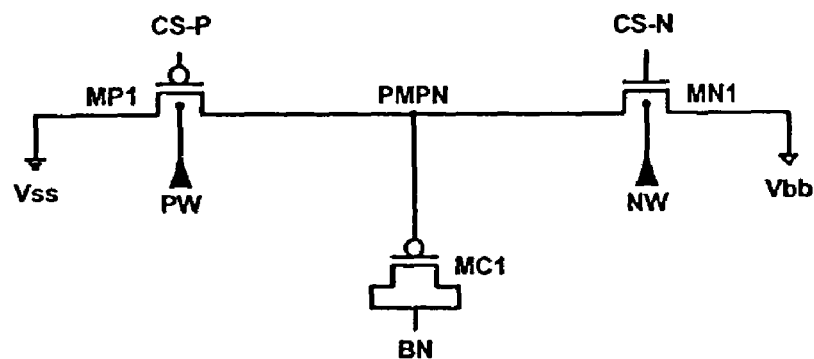
FIG. 1 is a simplified diagram of a $V_{bb}$ pump according to one embodiment.

FIG. 1 is a simplified diagram of a back bias voltage pump ($V_{bb}$ pump) according to one embodiment. The $V_{bb}$ pump includes a p-MOS transistor MP1, an n-MOS transistor MN1, and a second p-MOS transistor MC1 which functions as a capacitor. In the current embodiment, each transistor used by the $V_{bb}$ pump is a thin-gate transistor.

The source, drain, and gate terminals of p-MOS transistor MP1 are connected to $V_{SS}$ (i.e., ground), node PMPN, and control signal CS-P, respectively. The source, drain, and gate terminals of n-MOS transistor MN1 are connected to node PMPN, to an output line carrying $V_{bb}$, and to the control signal CS-N, respectively. The source and drain terminals of p-MOS transistor MC1 are connected to the control signal BN and the gate terminal of p-MOS transistor MC1 is connected to node PMPN. In the current embodiment, the control signals CS-P, CS-N, and BN are non-overlapping, active low signals.

A pumping operation for the $V_{bb}$ pump may be subdivided into two-steps: a charging step and a boost step. During the charging step, MN1 and MC1 are rendered non-conductive by control signals CS-N and BN, respectively. Control signal CS-P is then driven to $-V_{CC}$, thus rendering transistor MP1 conductive and charging node PMPN to $V_{SS}$ (i.e., ground). After node PMPN is driven to $V_{SS}$, control signal CS-P is driven to 0V, thus rendering transistor MP1 non-conductive.

During the boosting step, control signal BN is driven to $-V_{CC}$, thus rendering capacitor MC1 conductive and driving node PMPN to $-(V_{CC}-V_t)$, where $V_t$ is the threshold voltage of MC1. Control signal CS-N is then driven from 0V to $-V_{CC}$ volts, thus rendering MN1 conductive and allowing the voltage stored on node PMPN to be transferred to the output line. In the current embodiment, the voltage transferred to the output line is equal to $-(V_{CC}-2V_t)$ and may be referred to as the back bias voltage, $V_{bb}$.

In the current embodiment, thin-gate transistors may be used for MP1, MN1, and MC1. Accordingly, efficiencies of 80% or more have been simulated for the $V_{bb}$ pump with $V_{CC}$=1.2V, $V_T$=0.3V, and $V_{bb}$=–0.6V. To avoid breakdown or punch-though of the thin-gate transistors, the gates of MP1 and MN1 are driven to 0V when node PMPN is driven to voltage –$V_{CC}$, thus guarantying that absolute value of the gate-to-source voltage ($|V_{GS}|$), the absolute value of the gate-to-drain ($|V_{GD}|$), and absolute value of the drain-to-source voltage ($|V_{DS}|$) do not exceed $V_{CC}$. Additionally, when node PMPN is driven to 0V, the gates of MP1 and MN1 are driven to –$V_{CC}$, thus again guarantying that $|V_{GS}|$, $|V_{GD}|$, and $|V_{DS}|$ do not exceed $V_{CC}$.

Figure 2:
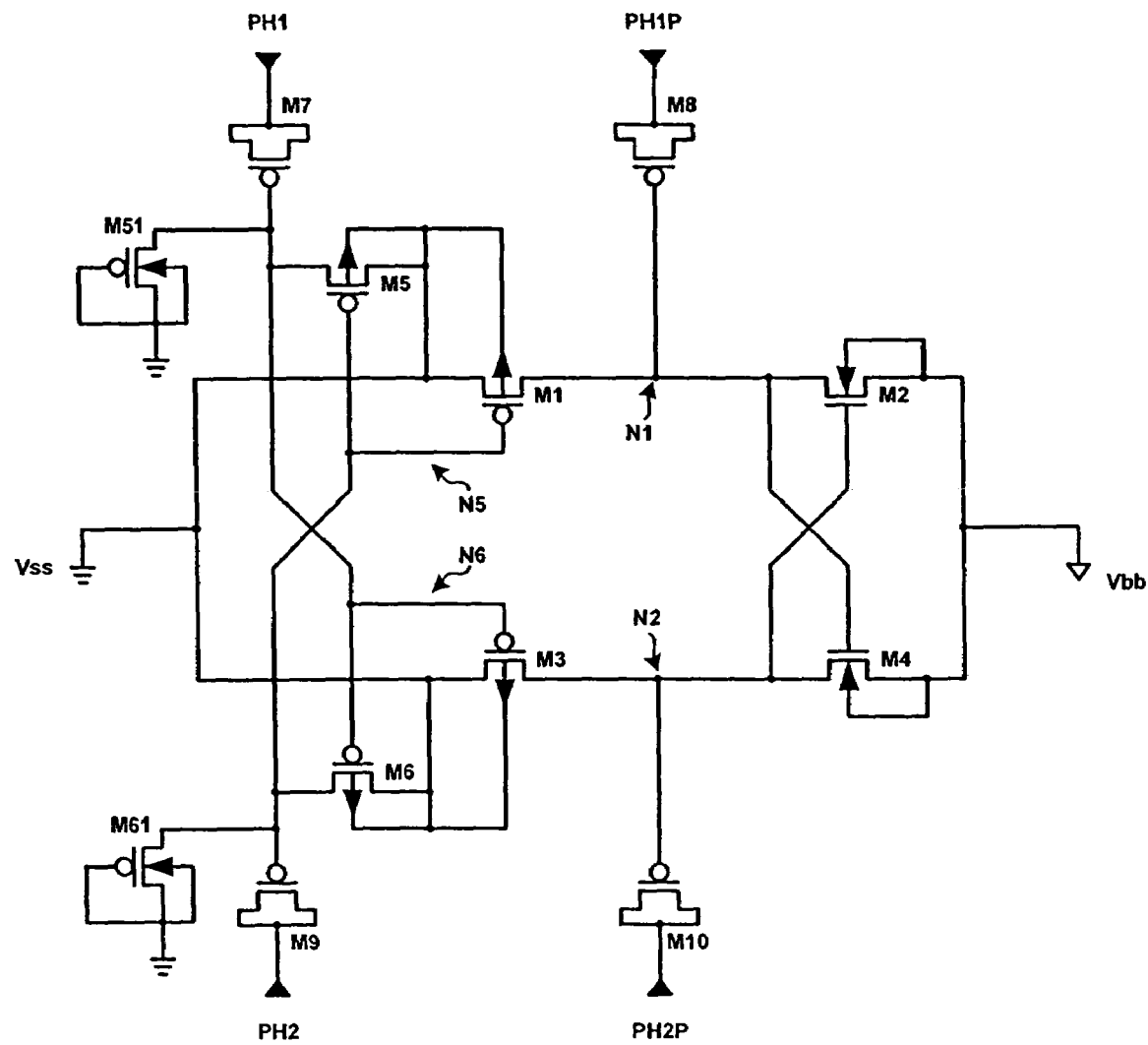
FIG. 2 is a detailed diagram of the $V_{bb}$ pump of FIG. 1 according to one embodiment.

FIG. 2 is a detailed diagram of the $V_{bb}$ pump of FIG. 1 according to one embodiment. The $V_{bb}$ pump 15 is comprised of first and second stages. The first stage is comprised of transistors M51, M5, M7, M1, M8, and M2. The second stage is comprised of transistors M61, M6, M9, M3, M10, and M4. The stages are responsive to control signals PH1, PH1P, PH2, and PH2P. More specifically, control signals PH1, PH1P, PH2, and PH2P are applied in a manner which guarantees that the voltages present at nodes N1 and N2 are never higher than $|V_{CC}|$. Accordingly, charge injection into the n-well of the p-transistors (e.g., M1, M5, M3, M6, etc.) is eliminated. In the current embodiment, transistors M1-M9, M51, and M61 may be thin-gate transistors.

Figure 6:
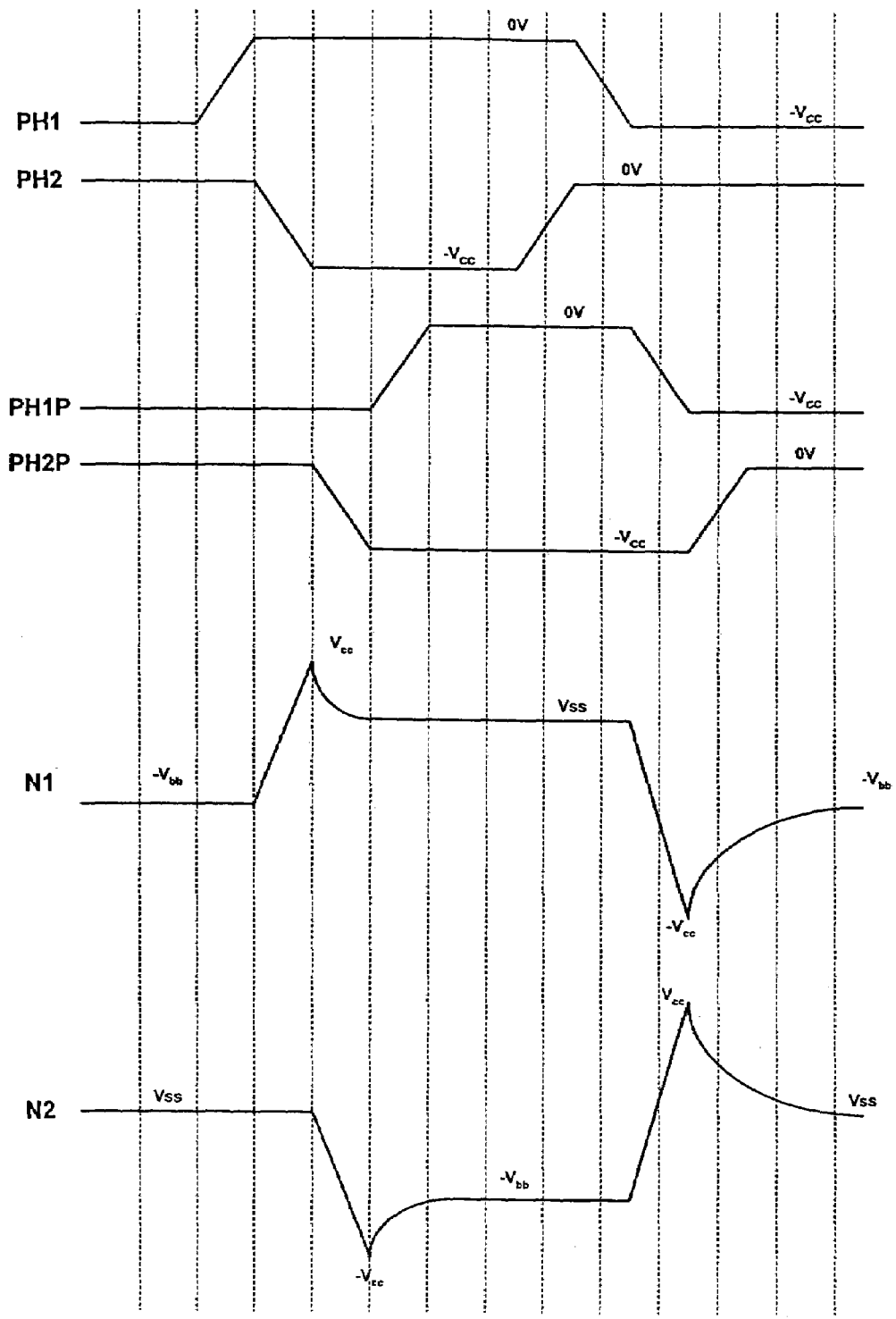
FIG. 6 illustrates timing waveforms for the clock signals and nodes of the $V_{bb}$ pumps of FIGS. 2-4 according to one embodiment.

FIG. 6 illustrates the timing waveforms for the clock signals PH1, PH1P, PH2, and PH2P for the $V_{bb}$ pump 15 of FIG. 2 according to one embodiment. Signals PH1, PH2, PH1P, and PH2P are active-low clock signals. The control signals may be generated by a timing control logic (not shown). The control signals alternately charge and fire each stage to generate the output voltage, $V_{bb}$. Additionally, FIG. 6 illustrates timing waveforms for signals present at nodes N1 and N2 of the $V_{bb}$ pump 15 of FIG. 2 according to one embodiment.

Returning to FIG. 2, the first and second stages are symmetrical to each other in the current embodiment. The operation of the first stage and second stage are essentially the same with the exception of the complimentary timing required to alternate the firing of each stage. As discussed above in conjunction with FIG. 1, the timing and values of the control signals are managed to prevent $|V_{GS}|$, $|V_{GD}|$, and $|V_{DS}|$ for the transistors from exceeding $V_{CC}$. Thus, the thin-gate transistors used by $V_{bb}$ pump 15 are protected from punch-through, latch-up, gate oxide degradation (for example, from hot electron effects such as time dependent dielectric breakdown (TDDB), voltage threshold ($|V_t|$) shifts from hot electron trapping, and excess substrate current (for example, due to avalanche multiplication), among others. Other benefits, such as the reduction and/or elimination of charge injection, may also be achieved.

Referring to the first stage, during the charging step, M2 and M8 are rendered non-conductive by control signals PH1 (which connects the gate of M2 to $V_{SS}$ via M3) and PH1P, respectively. Control signal PH2 is then driven to –$V_{CC}$, thus rendering transistor M1 conductive and charging node N1 to $V_{SS}$ (i.e., ground). After node N1 is driven to $V_{SS}$, control signal PH2 is driven to 0V, thus rendering transistor M1 non-conductive. Because it is used to charge node N1 to $V_{SS}$, transistor M1 may be referred to as a "charging transistor." During the boosting step, control signal PH1P is driven to –$V_{CC}$, thus rendering capacitor M8 conductive and driving node N1 to –$V_{CC}$–$V_t$), where $V_t$ is the threshold voltage of M8. Because it is used to boost node N1 from $V_{SS}$ to –$V_{CC}$–$V_t$), capacitor M8 may be referred to as a "pumping capacitor." Control signal PH1 is then driven from 0V to –$V_{CC}$ volts, thus rendering M2 conductive and allowing the voltage stored on node N1 to be transferred to the output line. In the current embodiment, the voltage transferred to the output line is equal to –($V_{CC}$–2Vt) and may be referred to as $V_{bb}$. Because it is used to pump the charge stored on node N1 to the output line, transistor M2 may be referred to as a "pumping transistor." It should be apparent to one of ordinary skill in the art that the second stage operates in a similar manner.

Figure 11A:
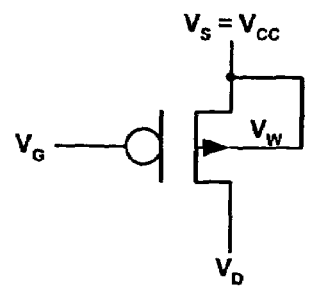
FIGS. 11A and 11B are simplified and cross-sectional diagrams, respectively, illustrating the electrical connections for a typical p-channel transistor.
Figure 11B:
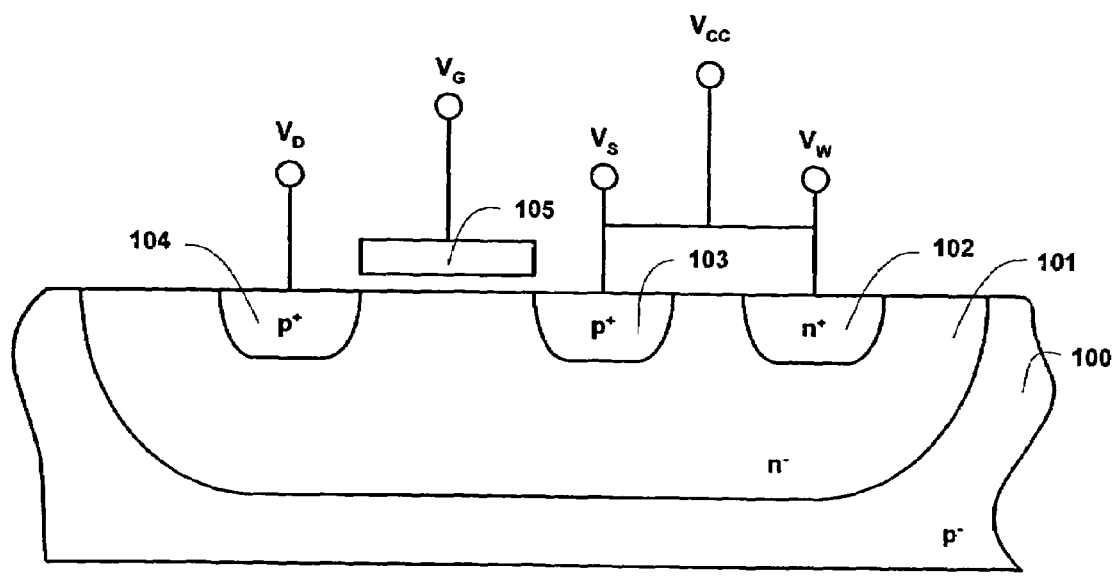

Typically, p-channel transistors have wells connected to $V_{cc}$ to prevent forward biasing and charge injection. Referring briefly to FIGS. 11A and 11B, a simplified view and a cross-sectional view, respectively, of the electrical connections for a typical p-channel transistor are shown, where $V_G$ represents the gate voltage, $V_S$ represents the source voltage, $V_D$ represents the drain voltage, and $V_W$ represents the well voltage. If electrically connected as shown, the transistor will conduct when the absolute value of the gate-to-source voltage ($|V_{GS}|$) is greater than the absolute value of the p-channel transistor's threshold voltage ($|V_T|$). The typical p-channel transistor has a threshold voltage ($V_T$) of approximately –0.3V. Thus the p-channel transistor will conduct if, for example, $V_G$=0, $V_S$=$V_{CC}$=$V_W$=1V, and $V_T$=–0.3V (i.e., $V_{GS}$=0V–1V=–1V and 1|$V_{GS}$|>|$V_T$|).

As best seen in FIG. 11B, the p-channel transistor includes a p⁻ substrate 100, a n⁻ well 101, n⁺ doped well connection region 102, p⁺ doped source connection 103, p⁺ doped drain connection 104, and a polysilicon gate connection 105. The voltage $V_{CC}$ is applied to both the well and source connections.

Figure 12A:
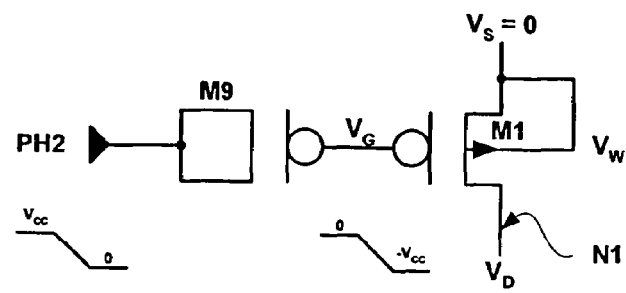
FIGS. 12A and 12B are simplified diagram and cross-sectional diagrams, respectively, illustrating the electrical connections for a p-channel transistor according to one embodiment.
Figure 12B:
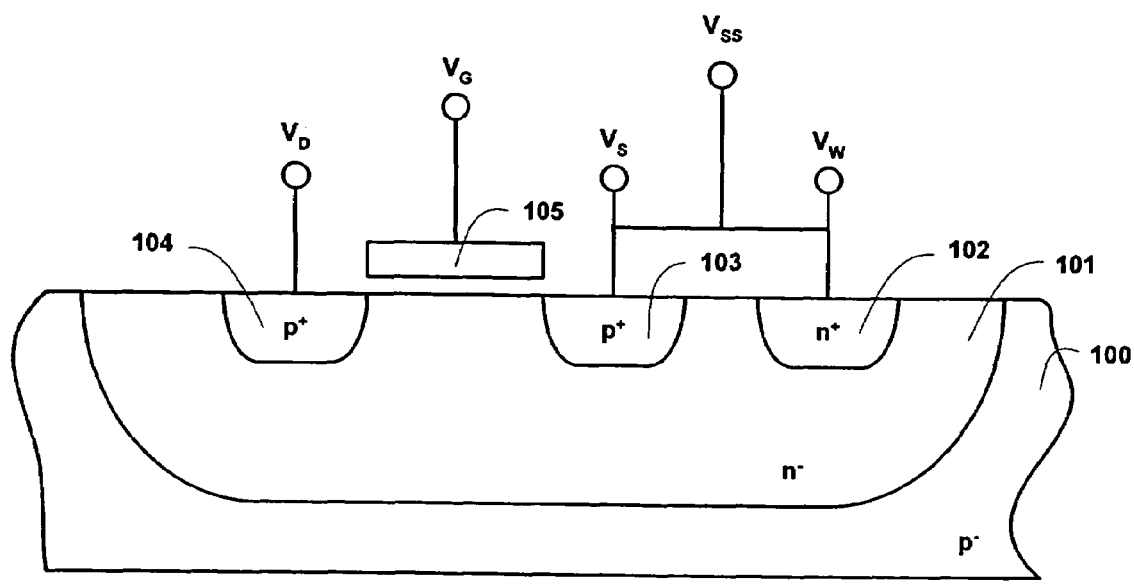

In the embodiment illustrated in FIG. 2, however, p-channel transistors M1, M3, M5 and M6 have their n-wells connected to $V_{SS}$ (i.e., ground). Referring briefly to FIGS. 12A and 12B, a simplified view and a cross-sectional view, respectively, of the electrical connections for a p-channel transistor according to one embodiment are shown. As seen in FIGS. 12A and 12B, $V_{SS}$ (which is equal to 0V) is applied to the well and source connections (as opposed to $V_{CC}$ in FIGS. 11A and 11B). By applying $V_{SS}$ to the well and source, any n-well bias is removed and the threshold voltage of the transistor is reduced. A p-channel transistor connected in this manner may be turned on by coupling the gate low, for example, as best seen in FIG. 12A, the gate is coupled low (i.e., $V_{GS}$=–$V_{CC}$–0=–$V_{CC}$) using transistor M9 as a capacitor.

By connecting the transistor wells to $V_{SS}$ as in the current embodiment, the threshold voltage ($|V_t|$) is reduced because the bulk voltage ($V_{sb}$) is equal to zero volts. A lower $|V_t|$ allows the transistor to operate at a lower voltage and to pass a larger drive current ($I_{ON}$). The clocking of the p-channel transistors (e.g., M1, M3, M5, and M6) is controlled to prevent forward biasing of junctions while utilizing the grounded n-well connection.

Figure 13A:
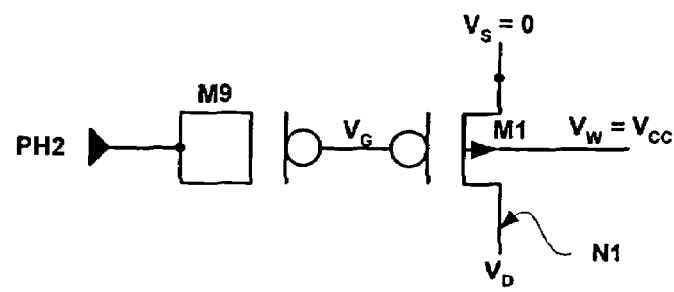
FIGS. 13A and 13B are simplified diagram and cross-sectional diagrams, respectively, illustrating the electrical connections for a p-channel transistor according to an alternative embodiment.
Figure 13B:
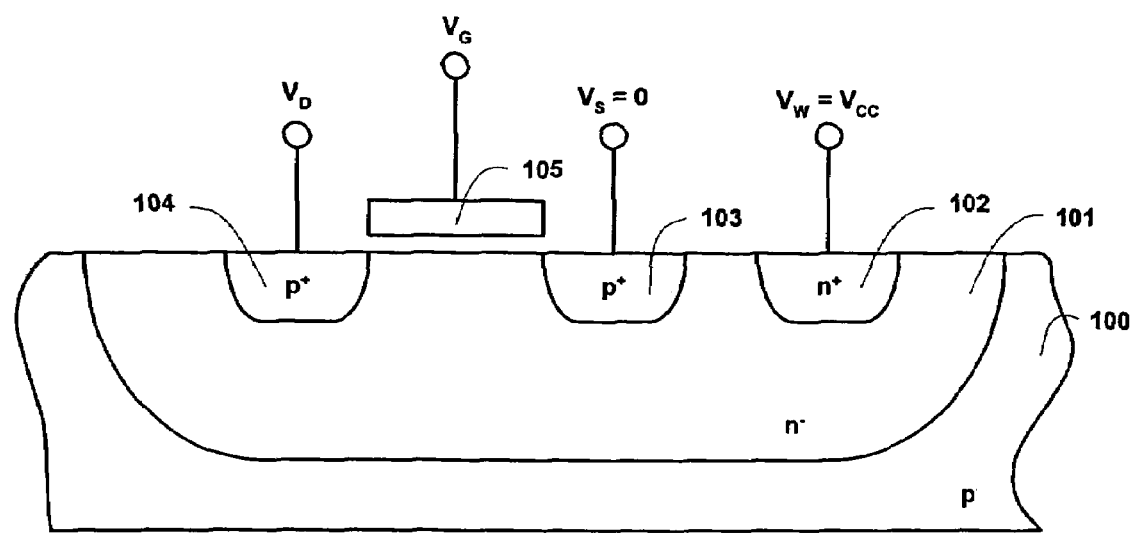

FIGS. 13A and 13B are simplified diagram and cross-sectional diagrams, respectively, illustrating the electrical connections for a p-channel transistor according to an alternative embodiment. As seen in FIGS. 13A and 13B, $V_{CC}$ is applied to the well connection and $V_{SS}$ is applied to the source connection. This type of connection, however, increases the threshold voltage of the transistor in comparison to the connection illustrated in FIGS. 12A and 12B.

Figure 14:
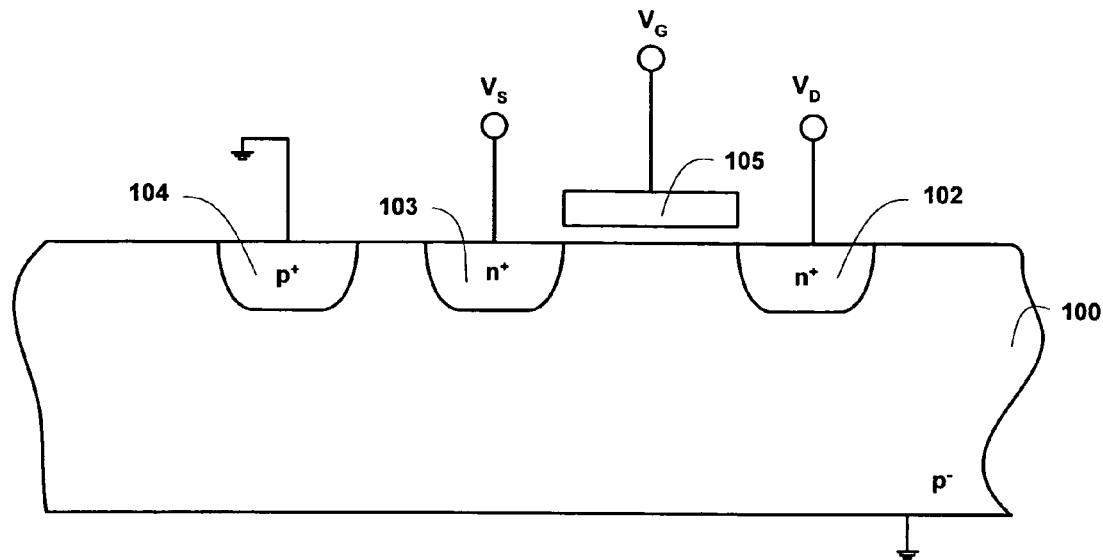
FIG. 14 is a cross-sectional diagram illustrating the electrical connections for a typical n-channel transistor.

Typically n-channel transistors have their p-well connected to the lowest potential voltage which is usually $V_{SS}$ (i.e., ground). Referring briefly to FIG. 14, a cross-sectional diagram illustrating the electrical connections for a typical n-channel transistor is shown. As best seen in FIG. 14, the n-channel transistor includes a p⁻ substrate 100, a p⁺ doped well connection 114, n+ doped source connection 113, n+ doped drain connection 112, and a polysilicon gate connection 115.

In the embodiment illustrated in FIG. 2, however, n-channel transistors M2 and M4 have their p-wells connected to $V_{bb}$ to prevent forward biasing and charge injection, for example, when the voltages at nodes N1 and N2 are more negative than $V_{SS}$ (e.g., at $V_{bb}$, as seen in FIG. 6).

Figure 15:
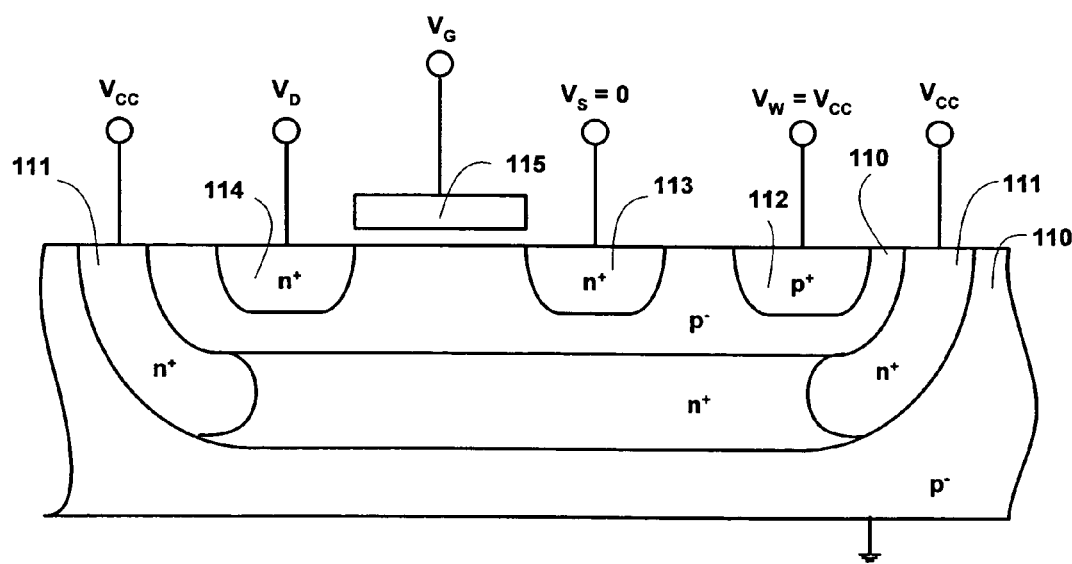
FIG. 15 is a cross-sectional diagram illustrating the electrical connections for an n-channel transistor according to one embodiment.
Figure 16:
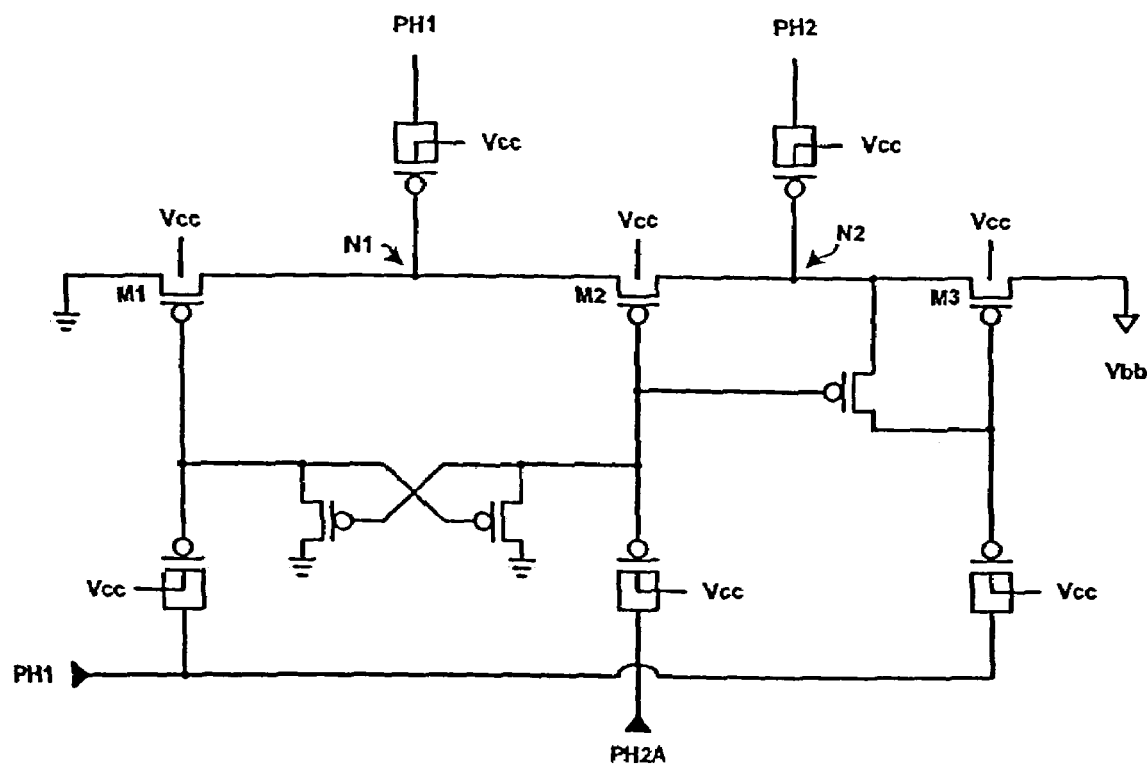
FIG. 16 illustrates a $V_{ccp}$ pump which utilizes thick-gate transistors according to the prior art.
Figure 17:
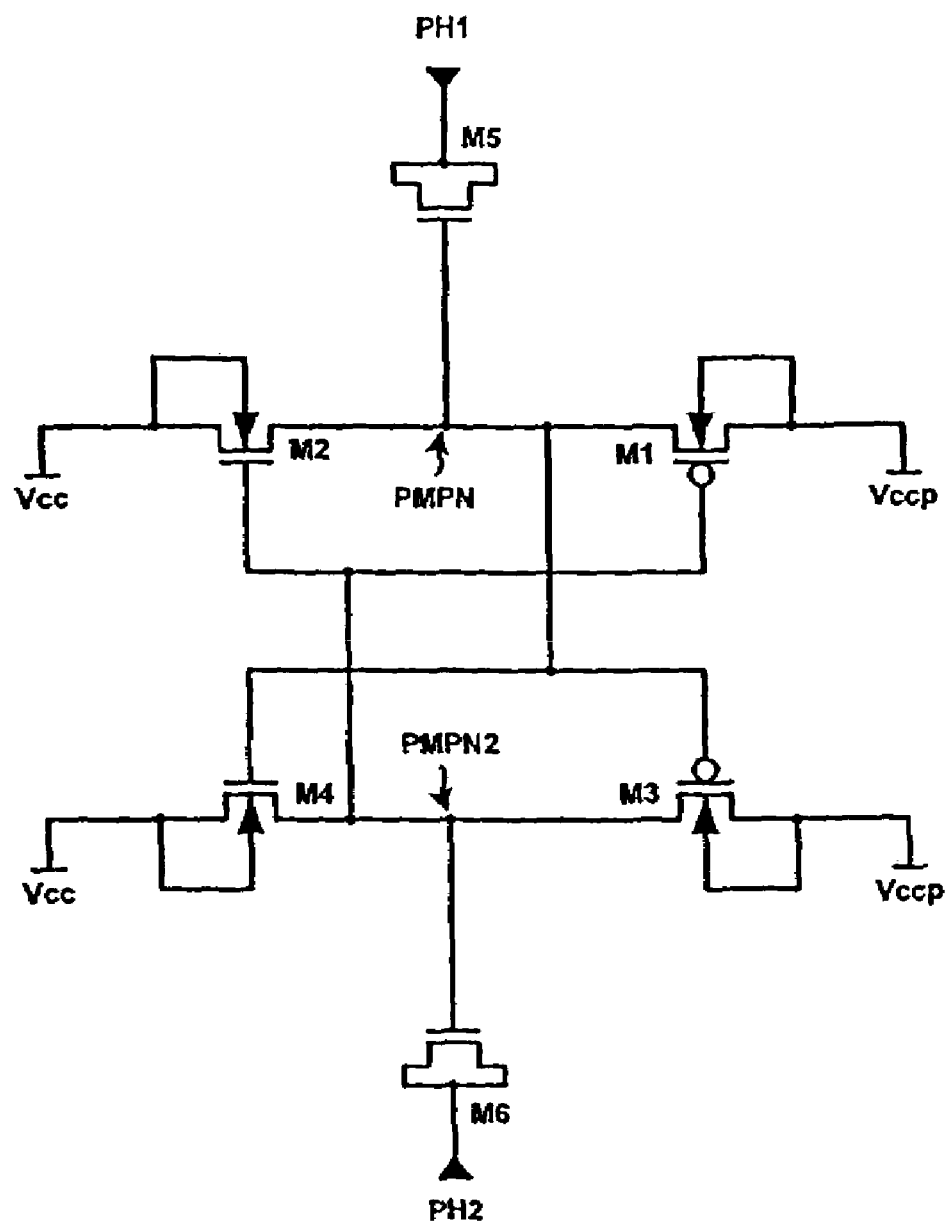
FIG. 17 illustrates a single stage $V_{ccp}$ pump according to the prior art.
Figure 18:
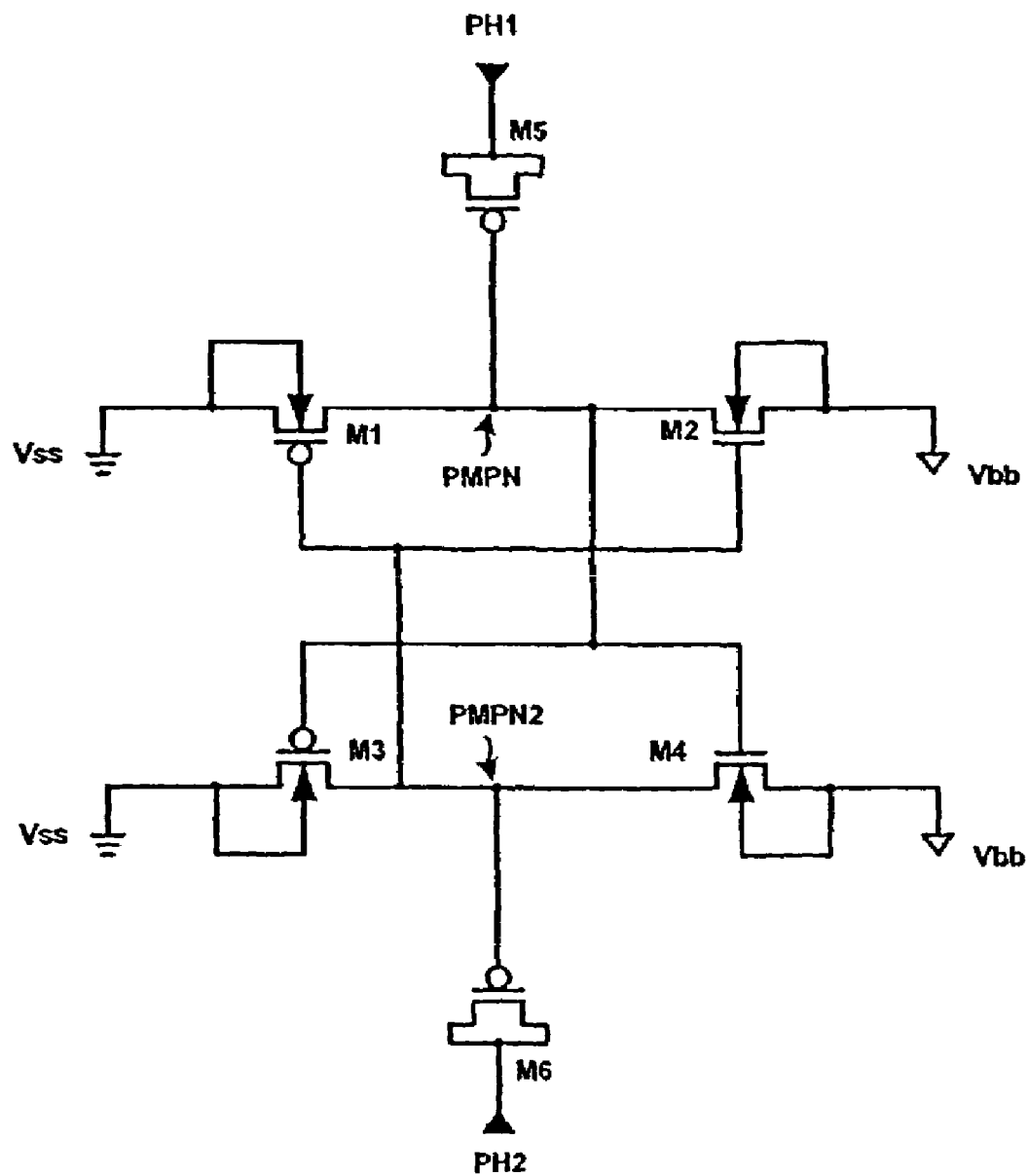
FIG. 18 illustrates a single stage $V_{bb}$ pump according to the prior art.

In an alternative embodiment, the n-channel transistors (e.g., M2 and M4) may utilize deep n-wells. FIG. 15 is a cross-sectional diagram illustrating the electrical connections for an n-channel transistor utilizing a deep n-well according to one embodiment. The n-channel transistor includes a p− substrate 110 having a n+ doped deep well 111 therein, an n+ doped drain connection 114, an n+ doped source connection 113, a p+ doped well connection 112, and a polysilicon gate connection 115. As seen in FIG. 15, the p+ doped well connection 112 is switched and the deep n-well 111 is connected to $V_{CC}$.

In the current embodiment, M2 is used as the main pumping transistor for the first stage. Accordingly, M2 is sized large enough to pass a desired amount of output current. To turn on transistor M2, the gate of M2 is driven to $V_{SS}$ (as compared to $V_{CC}$ in prior art pumps). More specifically, PH1 goes low thereby driving node N2 to $V_{SS}$ through transistor M3. M2 turns on because N1 couples negative (i.e., is drawn to −$V_{CC}$ by control signal PH1P) and thus, $V_{GS}|_{M2}=V_{N2}-V_{N1}=0-(-V_{CC})=V_{CC}$, which guarantees that the gate-to-source v ($|V_{GS}|$) does not exceed $V_{CC}$.

As discussed above, the first stage includes transistor M51. Transistor M51 is a p-channel transistor that is used for start-up purposes. Transistor M51 insures that node N6 is never more positive than a $V_t$ of transistor M51. In the current embodiment, the well of transistor M51 is connected to $V_{SS}$ to allow a lower startup voltage, however, the well of M51 may be connected to another voltage (e.g., $V_{CC}$) if desired.

Transistor M5 is a p-channel transistor that precharges (to $V_{SS}$) the gates of transistors M3 and M6. Transistors M1 and M5 are gated by control signal PH2 through transistor M9. Transistor M1 is a p-channel transistor for precharging node N1 (to $V_{SS}$). Transistor M9 is a p-channel transistor, connected as a capacitor, which is responsive to control signal PH2.

Transistor M8 is a p-channel transistor, connected as a capacitor, that pumps node N1 to $V_{bb}$. As discussed above, transistor M2 is a large n-channel transistor for pumping the negative charge from node N1 to $V_{bb}$.

Likewise, M4 is used as the main pumping transistor for the second stage. Accordingly, M4 is sized large enough to pass a desired amount of output current. To turn on transistor M4, the gate of M4 is driven to $V_{SS}$ (as compared to $V_{CC}$ in prior art pumps), which guarantees that the gate-to-source voltage ($|V_{GS}|$) does not exceed $V_{CC}$. More specifically, PH2 goes low thereby driving N1 to $V_{SS}$ through transistor M1.

As discussed above, the second stage includes a transistor M61. Transistor M61 is a p-channel transistor that is used for start-up purposes. Transistor M61 insures that node N5 is never more positive than a $V_t$ of transistor M61. In the current embodiment, the well of transistor M61 is connected to $V_{SS}$ to allow a lower startup voltage, however, the well of M61 may be connected to another voltage (e.g., $V_{CC}$) if desired. In the current embodiment, each stage includes a start-up transistor (e.g., M51, M61), however, it should be apparent to one skilled in the art that the number of start-up transistors used may be varied while remaining within the scope of the present invention. For example, start-up transistors may be eliminated from the $V_{bb}$ pump, a single start-up transistor may be utilized, etc.

Transistor M6 is a p-channel transistor that precharges (to $V_{SS}$) the gates of transistors M1 and M5. Transistor M3 is a p-channel transistor for precharging node N2 (to $V_{SS}$). Transistors M3 and M6 are gated by control signal PH1 through transistor M7. Transistor M7 is a p-channel transistor, connected as a capacitor, which is responsive to control signal PH1.

Transistor M10 is a p-channel transistor, connected as a capacitor, that pumps node N2 to $V_{bb}$. As discussed above, transistor M4 is a n-channel transistor for pumping the negative charge from node N2 to $V_{bb}$.

Figure 3:
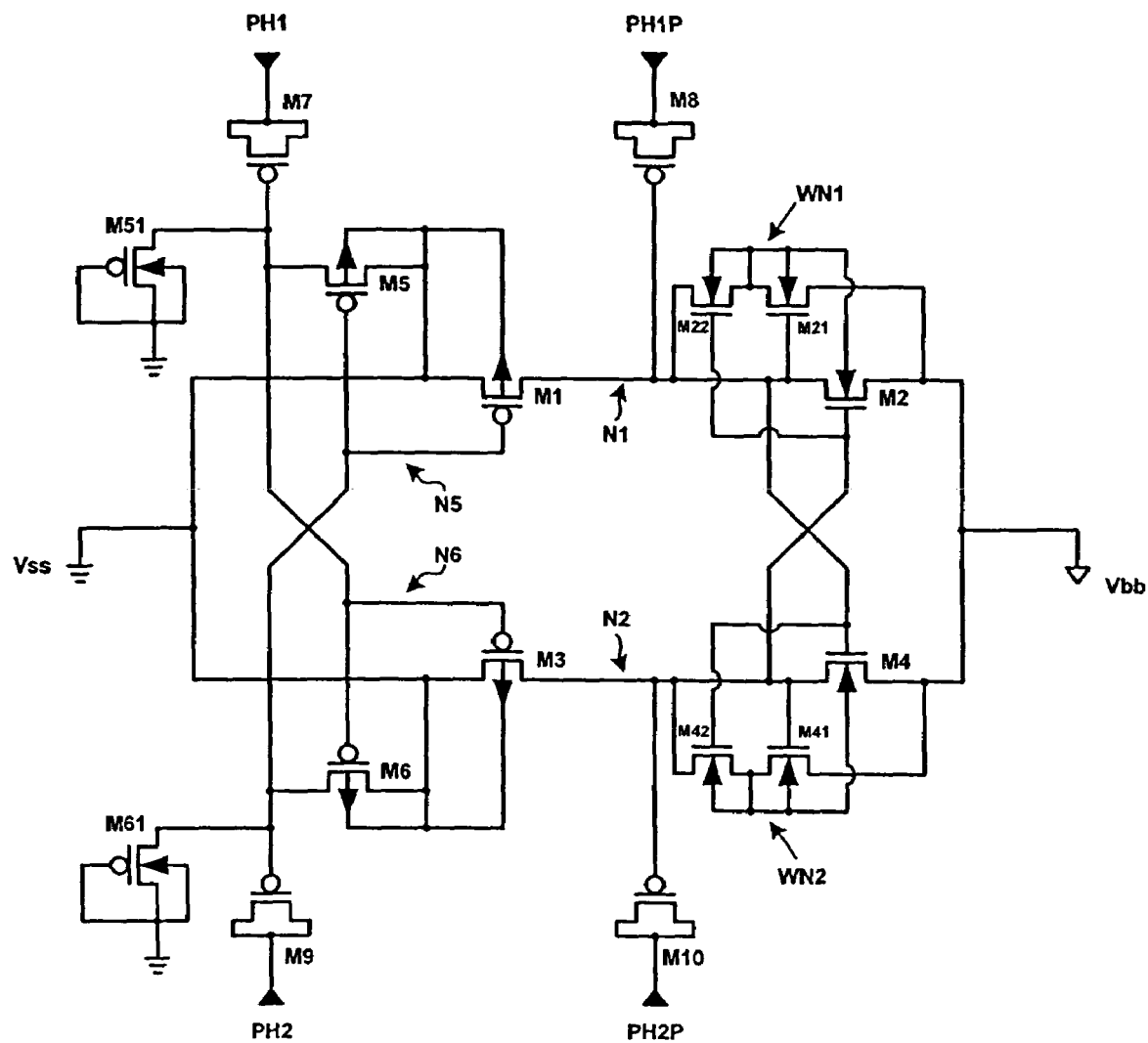
FIG. 3 is a detailed diagram of the $V_{bb}$ pump of FIG. 1 according to an alternative embodiment.

FIG. 3 is a detailed diagram of the $V_{bb}$ pump of FIG. 1 according to an alternative embodiment. The construction and operation of the $V_{bb}$ pump 20 illustrated in FIG. 3 is similar to $V_{bb}$ pump 15 illustrated in FIG. 2. As discussed above in conjunction with FIG. 2, the first and second stages of $V_{bb}$ pump 20 are responsive to control signals PH1, PH1P, PH2, and PH2P which are applied in a manner to guarantee that voltages present at nodes N1 and N2 are never higher than $|V_{CC}|$. Accordingly, charge injection into the n-well of the p-transistors (e.g., M1, M5, M3, M6, etc.) is eliminated.

However, the first stage of $V_{bb}$ pump 20 further includes transistors M21 and M22 and the second stage of $V_{bb}$ pump 20 further includes transistors M41 and M42. The transistors M21 and M22 and transistors M41 and M42 are used to form a switched floating p-well for transistors M2 and M4, respectively. More specifically, the wells of transistors M2, M21, and M22 are switched to node WN1 and the wells of transistors M4, M41, and M42 are switched to node WN2. Typically n-channel transistors have their p-well connected to the lowest potential voltage which is usually $V_{SS}$ (i.e., ground). However, because nodes N1 and N2 can be more negative than $V_{SS}$ (e.g., at $V_{bb}$, as seen in FIG. 3) in the current embodiment, the p-well connection is switched to either node WN1 or to node WN2, respectively. In the current embodiment, transistors M1-M9, M21, M22, M41, M42, M51, and M61 may be thin-gate transistors.

In the current embodiment, M2 is used as the main pumping transistor for the first stage. Accordingly, M2 is sized larger than M21 and M22. M21 and M22 are thus used to switch the well connection. For example, when N1 is more negative than $V_{bb}$ (e.g., when N1 is at −$V_{cc}$ as seen in FIG. 6), M22 is conductive and N1 is connected to node WN1. When $V_{bb}$ is more negative than N1 (e.g., when N1 is at $V_{SS}$ as seen in FIG. 6), M21 is conductive and $V_{bb}$ is connected to node WN1. To facilitate well switching, the n-channel transistors of the current embodiment are formed in a p-well inside of a deep well. Accordingly, either $V_{bb}$ or the voltage at node N1 (whichever is more negative) may be used to drive the p-well and deep n-well of the n-channel transistors M2, M21, and M22.

Likewise, M4 is used as the main pumping transistor for the second stage. Accordingly, M4 is sized larger than M41 and M42. M41 and M42 are used to switch the well connection. For example, when N2 is more negative than $V_{bb}$ (e.g., when N2 is at −$V_{cc}$ as seen in FIG. 6), M42 is on and N2 is connected to node WN2 and when $V_{bb}$ is more negative than N2 (e.g., when N2 is at 0V as seen in FIG. 6), M41 is one and $V_{bb}$ is connected to node WN2. To facilitate well switching, the n-channel transistors of the current embodiment are formed in a p-well inside of a deep well. Accordingly, either $V_{bb}$ or the voltage at node N2 (whichever is more negative) may be used to drive the p-well and deep n-well of the n-channel transistors M4, M41, and M42.

Figure 4:
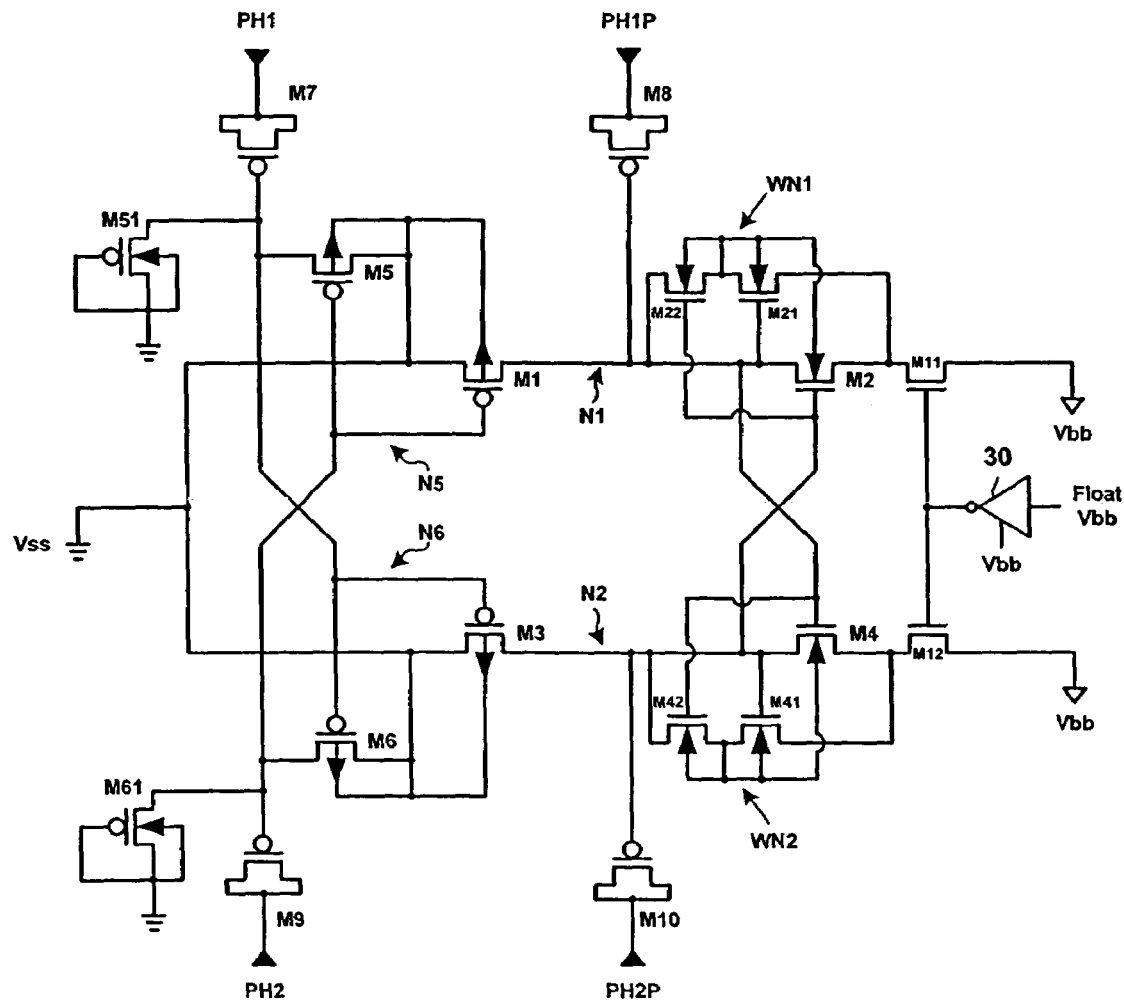
FIG. 4 is a detailed diagram of the $V_{bb}$ pump of FIG. 1 according to another alternative embodiment.

FIG. 4 s a detailed diagram of the $V_{bb}$ pump of FIG. 1 according to another alternative embodiment. The construction and operation of the $V_{bb}$ pump 25 illustrated in FIG. 4 is similar to $V_{bb}$ pump 15 and $V_{bb}$ pump 20 as illustrated in FIGS. 2 and 3, respectively. As discussed above in conjunction with FIG. 2, the first and second stages of $V_{bb}$ pump 25 are responsive to control signals PH1, PH1P, PH2, and PH2P which are applied in a manner which guarantee that voltages present at nodes N 1 and N2 are never higher than $|V_{CC}|$. Accordingly, charge injection into the n-well of the p-transistors (e.g., M1, M5, M3, M6, etc.) is eliminated.

Additionally as discussed in conjunction with FIG. 3, the first stage of $V_{bb}$ pump 25 includes transistors M21 and M22 and the second stage of $V_{bb}$ pump 25 includes transistors M41 and M42, which are used to form a switched floating p-well for transistors M2 and M4, respectively. Accordingly, either $V_{bb}$ or the voltage at nodes N1, N2 (whichever is more negative) may be used to drive the p-well and deep n-well of the n-channel transistors. In the current embodiment, transistors M1-M9, M21, M22, M41, M42, M51, and M61 may be thin-gate transistors.

The first stage of $V_{bb}$ pump 25, however, includes a thick-gate transistor M11 and the second stage of $V_{bb}$ pump 25 includes a thick-gate transistor M12. The gates of transistors M11 and M12 are connected to the output of inverter 30. The input of inverter 30 receives the control signal FLOAT $V_{bb}$. In the current embodiment, thick-gate transistors M11 and M12 remain on unless the control signal FLOAT $V_{bb}$ is driven high. Accordingly, transistors M11 and M12 protect the thin-gate transistors of $V_{bb}$ pump 25 when $V_{bb}$ is forced to a voltage that is more negative than $-V_{CC}$ (for example, during device testing or burn-in).

Figure 5:
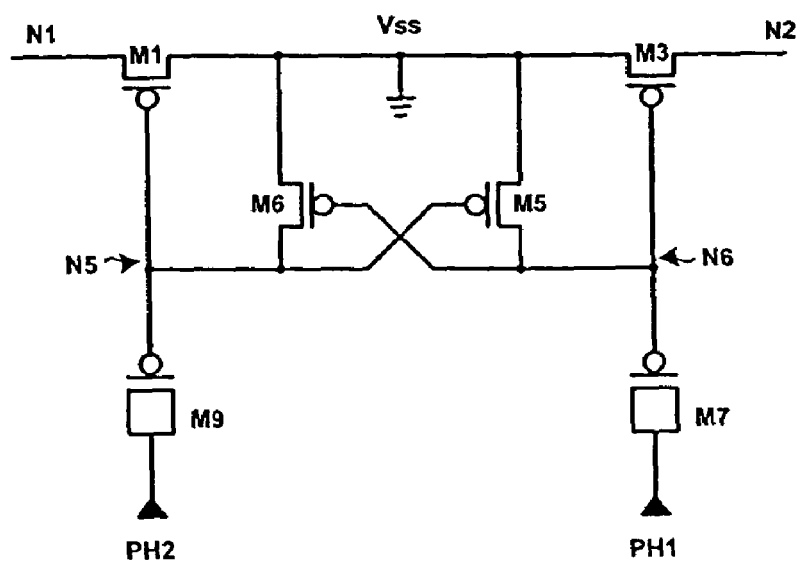
FIG. 5 illustrates a portion from each of the $V_{bb}$ pumps of FIG. 2-4 according to one embodiment.

FIG. 5 illustrates a portion from each of the $V_{bb}$ pumps described in conjunction with FIGS. 2-4. More specifically, the layout of a portion from each of the $V_{bb}$ pumps is redrawn to more clearly illustrate the operation of the cross-coupled transistors M5 and M6. As discussed above, control signals PH1 and PH2 are non-overlapping, active-low clock signals (ranging from 0V to $-V_{CC}$). When PH2 goes low (i.e., is driven to $-V_{CC}$), node N5 couples low (i.e., to $-V_{CC}$) through transistor M9, and transistors M1 and M5 are turned on. Transistor M1 couples node N1 to $V_{SS}$ and transistor M5 couples node N6 to $V_{SS}$. At this time, transistor M3 is off. After node N1 is driven to $V_{SS}$, control signal PH2 goes high (i.e., is driven to 0V) coupling node N5 to 0V and thus transistors M1 and M5 are turned off.

Control signal PH1 then goes low (i.e., is driven to $-V_{CC}$) and couples node N6 low (i.e., to $-V_{CC}$) through transistor M7, and transistors M3 and M6 are turned on. Transistor M3 couples node N2 to $V_{SS}$ and transistor M6 couples node N5 to $V_{SS}$. At this time, transistor M1 is off. After node N2 is driven to $V_{SS}$, control signal PH1 goes high (i.e., is driven to 0V) coupling node N6 to 0V and thus transistors M3 and M6 are turned off.

Figure 7:
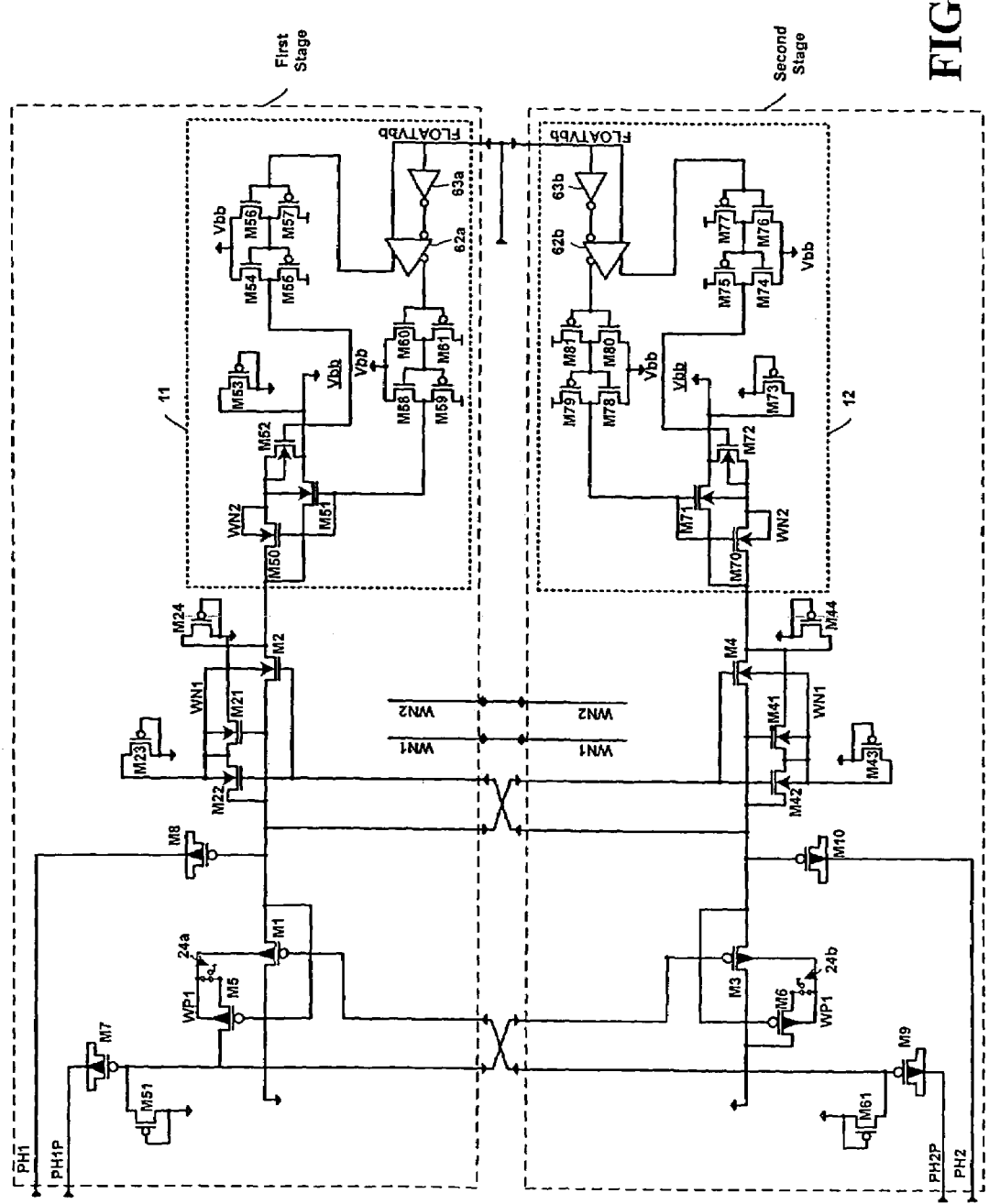
FIG. 7 is a more detailed circuit diagram of the $V_{bb}$ pump of FIG. 4 according to one embodiment.

FIG. 7 is a more detailed circuit diagram of the $V_{bb}$ pump 25 of FIG. 4 according to one embodiment. More specifically, the functions of transistors M11 and M12 are implemented using circuits 11 and 12, respectively. Circuits 11 and 12 are used to protect the thin-gate transistors of $V_{bb}$ pump 25 when $V_{bb}$ is forced to a voltage that is more negative than $-V_{CC}$ (for example, during device testing or burn-in). During testing or burn-in, the signal FLOATV$_{bb}$ is driven high which causes, in circuit 11, the gates of transistors M50 and M51 to be driven to $V_{bb}$ through a series of inverters (e.g., M58-M61) and which causes the gate of transistor M52 to be driven to $V_{CC}$ through a series of inverters (e.g., M54-M57). A $V_{bb}$ voltage on the gates of NMOS transistors M50 and M51 forces these transistors to be in the off state, thereby protecting transistors M1 and M2 from receiving a high negative voltage.

The $V_{CC}$ voltage on the gate of M52 causes the p-well (WN2) to be connected to $V_{bb}$ for all three transistors (i.e., M50, M51, and M52) hence protecting the p-well (WN2) of these transistors from forward biasing. It should be apparent to one skilled in the art that transistors M70, M71, and M72 operate in a similar manner in circuit 12. Transistors M50, M51, M52, M70, M71, and M72 are thick oxide transistors and can accept or tolerate high negative voltages used during burn-in.

Figure 8:
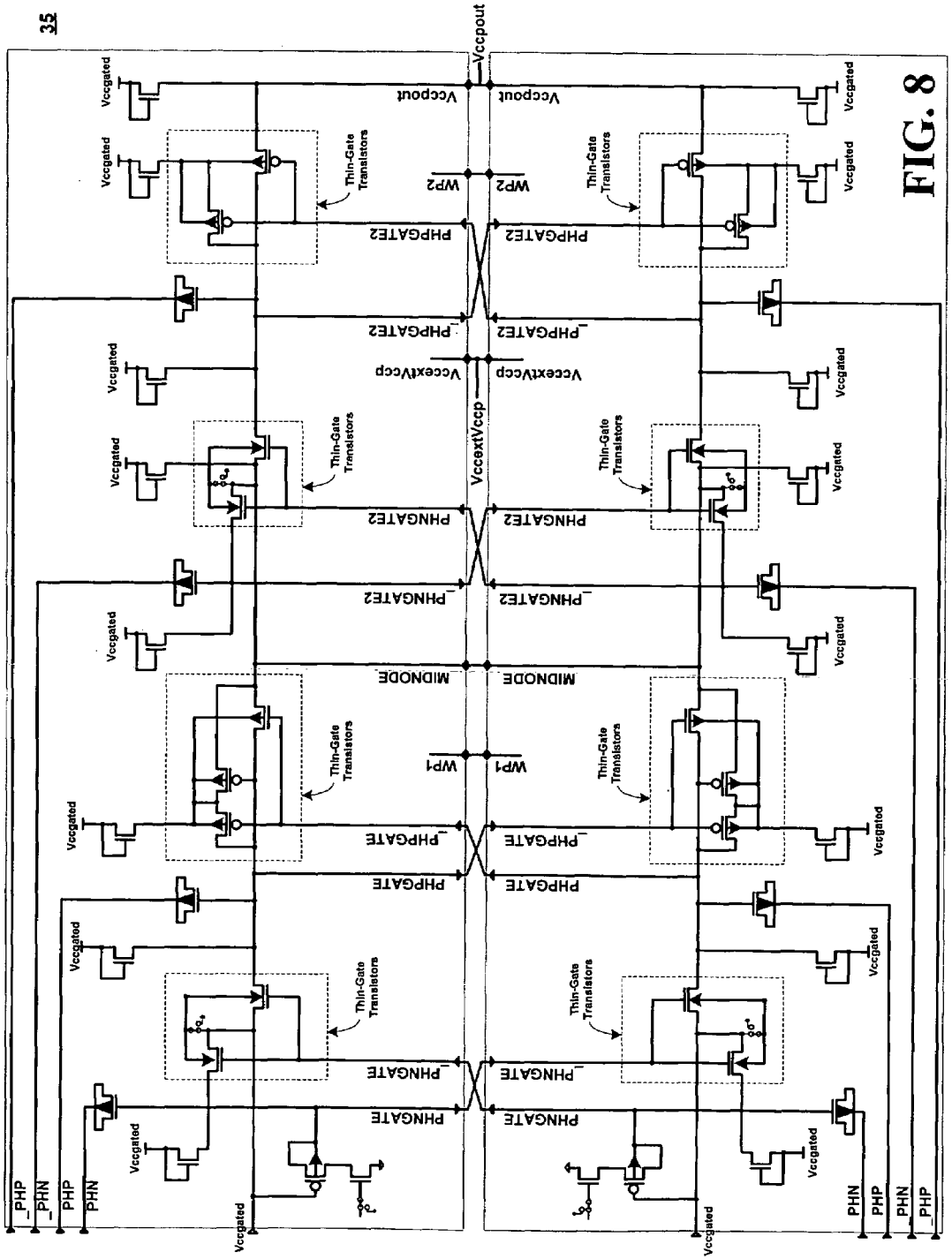
FIG. 8 is a detailed diagram of a $V_{CCP}$ pump according to one embodiment.

Although the current discussion has thus far been focused on $V_{bb}$ pumps, it should be apparent to one having ordinary skill in the art that the use of thin-gate transistors in $V_{CCP}$ pumps is also within the scope of the present invention. For example, FIG. 8 illustrates a $V_{CCP}$ pump 35 according to one embodiment. One having ordinary skill in the art will appreciate the general operational characteristics of a $V_{CCP}$ pump (e.g., charging a node to a first voltage, boosting the node to a second voltage, and connecting the node to an output). Thus, a detailed description of the general operation of the $V_{CCP}$ pump 35 is omitted.

In the current embodiment, $V_{CCP}$ pump 35 is comprised of symmetrical first and second stages. The operation of the first stage and second stage are essentially the same with the exception of the complimentary timing required to alternate the firing of each stage. It may be noted that, in the current embodiment, the timing and values of the control signals are managed to prevent $|V_{GS}|$, $|V_{GD}|$, and $|V_{DS}|$ for transistors, most notably the thin-gate transistors, from exceeding $V_{CC}$. Accordingly, the thin-gate transistors used by $V_{CCP}$ pump 35 are protected from punch-through, latch-up, gate oxide degradation (for example, from hot electron effects such as time dependent dielectric breakdown (TDDB), voltage threshold ($|V_t|$) shifts from hot electron trapping, and excess substrate current (for example, due to avalanche multiplication), among others. Other benefits, such as the reduction and/or elimination of charge injection, may also be achieved.

Figure 9:
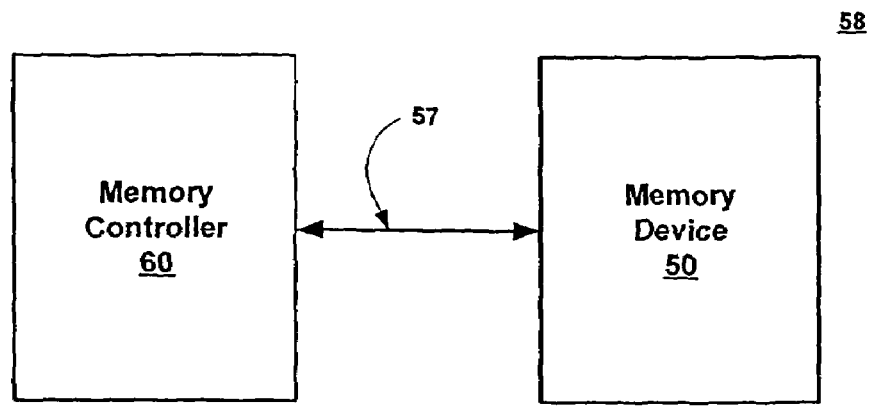
FIG. 9 is a simplified block diagram of a memory system according to one embodiment.

FIG. 9 is a simplified block diagram of a memory system 58 according to one embodiment. The memory system 58 includes a memory controller 60 and a memory device 50. It should be apparent to those skilled in the art that the memory system 58 may include other components while remaining within the scope of the present invention. For example, memory system 58 may include a microprocessor, micro-controller, ASIC, etc. which is in communication with the memory controller 60 and the memory device 50.

The memory controller 60 and the memory device 50 communicate via a system bus 57. In the current embodiment, the system bus 57 carries command signals, address signals, and data signals, among others. The system bus 57 may be sub-divided into two or more buses, for example a command bus (not shown), an address bus (not shown), and a data bus (not shown). The command bus may carry row address strobe (RAS#), column address strobe (CAS#), and write enable (WE#) command signals, among others. The address bus may carry bank address (BA0, BA1) and address input (A0-A12) signals, among others. The data bus may carry data input/output signals (DQ0-DQ15), data strobe signals (LDQS, LDQS#, UDQS, UDQS#), and data mask signals (LDM, UDM), among others. Additionally, some command signals, such as the chip select (CS#), clock enable (CKE), and on-die termination (ODT) signals may be carried by another portion of the system bus 57. It should be apparent to one skilled in the art that the topology of the system bus 57 (and its component parts) may be varied while remaining within the scope of the present invention. It should further be apparent to one skilled in the art that the illustrated signals are for exemplary purposes only and not intended to limit the present invention in any manner.

Figure 10:
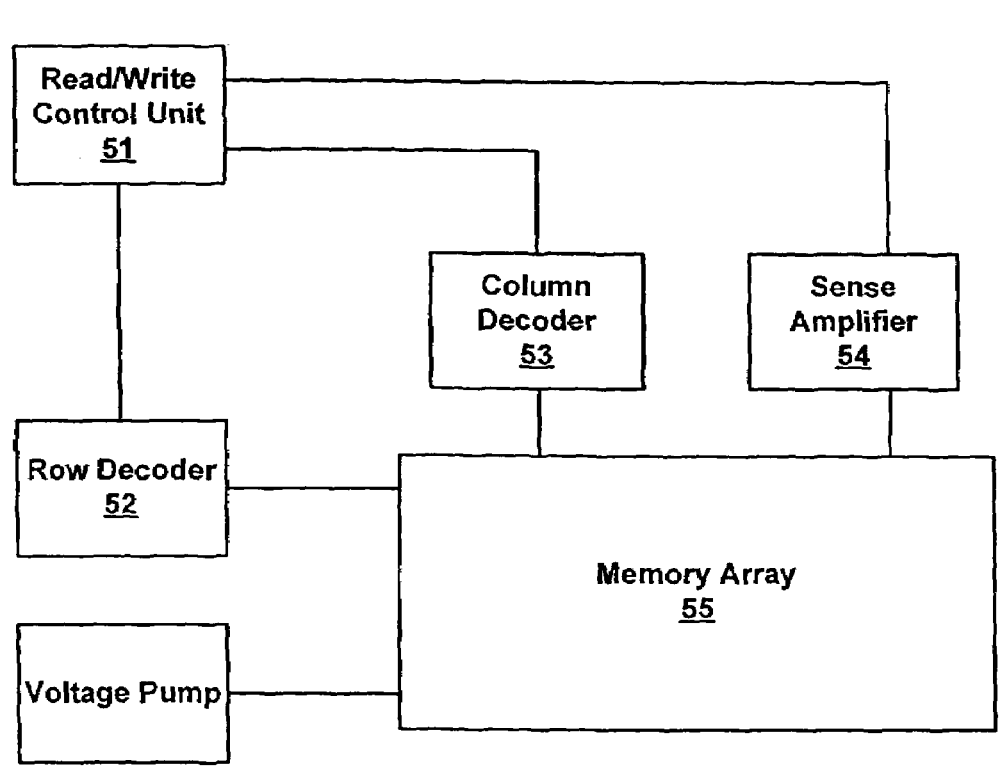
FIG. 10 is a simplified block diagram of the memory device of FIG. 9 according to one embodiment.

FIG. 10 is a simplified block diagram of the memory device 50 of FIG. 9 according to one embodiment. Memory device 50 is comprised of a read/write control unit 51, a row decoder 52, a column decoder 53, a sense amplifier 54, a memory array 55, and a voltage pump which may incorporate one or more features of the present invention.

The memory array 55 includes a plurality of memory cells organized in rows and columns. Each memory cell can hold one bit of data representing a binary zero and binary one. To access a particular memory cell within the memory array 55, for example during a read operation, the read/write control circuit 51 issues the row address of the cell to the row decoder 52 and the column address of the cell to the column decoder 53. The row and column decoders 52, 53 activate the cell and the sense amplifier 54 senses the information stored within the cell. The sense amplifier 54 may also be used to refresh the selected memory cell during the read operation. The voltage pump may be used to provide a voltage (for example, the voltage $V_{bb}$) to the memory device 50. The voltage pump may incorporate one or more features of the present invention. More specifically, $V_{bb}$ pump 15, $V_{bb}$ pump 20, $V_{bb}$ pump 25, and/or $V_{CCP}$ pump 35 may be incorporated into memory device 50 and supply the voltage $V_{bb}$ and/or $V_{CC}$ to one or more components of the memory device 50.

The read/write control unit 51 may be responsive to a plurality of command signals issued by the memory controller 60 via the a system bus 57 as discussed above in FIG. 9. The read/write control unit 51 may include a command decode circuit and mode register circuits, among others to decode and store the command signals. As discussed above, the read/write control unit 51 issues commands to the row decoder 52 and column decoder 53 and receives information from sense amplifier 54, among others. It should be apparent to those skilled in the art that the memory device 50 may include other components while remaining within the scope of the present invention.

It should be apparent to those of ordinary skill in the art that equivalent logic or physical circuits may be constructed using alternate logic elements while remaining within the scope of the present invention. For example, complementary logic (e.g., substituting p-MOS transistors for n-MOS transistors and vice versa) may be used with the appropriate logic changes while remaining with the scope of the present invention.

It should be recognized that the above-described embodiments of the invention are intended to be illustrative only. Numerous alternative embodiments may be devised by those skilled in the art without departing from the scope of the following claims.

What is claimed is:

1. A voltage pump, comprising:
   a charging transistor responsive to a first control signal, said charging transistor operable to connect a node to a first voltage;
   a pumping capacitor responsive to a second control signal, said pumping capacitor operable to pump additional charge to said node;
   a pumping transistor responsive to a third control signal, said pumping transistor operable to connect said node to an output;
   a precharging transistor responsive to said first control signal to connect another node to said first voltage, wherein the conductivity of said pumping transistor is responsive to said voltage on said another node;
   a start-up transistor operable to prevent said another node from exceeding the voltage of said start-up transistor by more than a threshold voltage;
   a capacitor responsive to said third control signal to connect said another node to a second voltage;
   an isolation transistor operable to disconnect said pumping transistor from said output; and
   wherein said charging transistor, said pumping capacitor, said pumping transistor, said precharging transistor, said start-up transistor, and said capacitor are thin-gate transistors.

2. The voltage pump of claim 1 further comprising one or more well-switching transistors operable to switch a well connection of said pumping transistor.

3. The voltage pump of claim 2 wherein said one or more well-switching transistors are thin-gate transistors.

4. The voltage pump of claim 1 wherein at least one of said charging transistor, said pumping capacitor, said pumping transistor, said precharging transistor, said start-up transistor, or said capacitor is a p-channel type transistor having an n+ doped well connection region connected to $V_{SS}$.

5. The voltage pump of claim 1 wherein at least one of said charging transistor, said pumping capacitor, said pumping transistor, said precharging transistor, said start-up transistor, or said capacitor is a n-channel type transistor having a switched p+ doped well connection region.

6. The voltage pump of claim 1 wherein at least one of said charging transistor, said pumping capacitor, said pumping transistor, said precharging transistor, said start-up transistor, or said capacitor is a n-channel type transistor having an deep n-well connected to $V_{CC}$ and a switched p+ doped well connection region.

7. The voltage pump of claim 1 wherein a source of said charging transistor is connected to a first voltage supply, a drain of said charging transistor is connected to said node, and the gate of said charging transistor is connected to said first control signal, wherein a source of said pumping capacitor is connected to said second control signal, a drain of said pumping capacitor is connected to said second control signal, and the gate of said pumping capacitor is connected to said node, and wherein a source of said pumping transistor is connected to said output, and a drain of said pumping transistor is connected to said node.

8. A voltage pump, comprising:
   a charging transistor responsive to a first control signal, said charging transistor operable to connect a node to a first voltage;
   a pumping capacitor responsive to a second control signal, said pumping capacitor operable to pump additional charge to said node;
   a pumping transistor responsive to a third control signal, said pumping transistor operable to connect said node to an output, wherein the absolute value of the gate-to-source, gate-to-drain, and drain-to-source voltages of said charging transistor, said pumping capacitor, and said pumping transistor do not exceed the absolute value of a supply voltage during said charging, boosting, and connecting;
   a precharging transistor responsive to said first control signal to connect another node to said first voltage, wherein the conductivity of said pumping transistor is responsive to said voltage on said another node;

a start-up transistor operable to prevent said another node from exceeding the voltage of said start-up transistor by more than a threshold voltage;

a capacitor responsive to said third control signal to connect said another node to a second voltage;

an isolation transistor operable to disconnect said pumping transistor from said output; and wherein said charging transistor, said pumping capacitor, said pumping transistor, said precharging transistor, said start-up transistor, and said capacitor are thin-gate transistors.

9. The voltage pump of claim 8 further comprising one or more well-switching transistors operable to switch a well connection of said pumping transistor.

10. The voltage pump of claim 9 wherein said one or more well-switching transistors are thin-gate transistors.

11. The voltage pump of claim 8 wherein at least one of said charging transistor, said pumping capacitor, said pumping transistor, said precharging transistor, said start-up transistor, or said capacitor is a p-channel type transistor having an $n^+$ doped well connection region connected to $V_{SS}$.

12. The voltage pump of claim 8 wherein at least one of said charging transistor, said pumping capacitor, said pumping transistor, said precharging transistor, said start-up transistor, or said capacitor is a n-channel type transistor having a switched $p^+$ doped well connection region.

13. The voltage pump of claim 8 wherein at least one of said charging transistor, said pumping capacitor, said pumping transistor, said precharging transistor, said start-up transistor, or said capacitor is a n-channel type transistor having an deep n-well connected to $V_{CC}$ and a switched $p^+$ doped well connection region.

14. The voltage pump of claim 8 wherein a source of said charging transistor is connected to a first voltage supply, a drain of said charging transistor is connected to said node, and the gate of said charging transistor is connected to said first control signal, wherein a source of said pumping capacitor is connected to said second control signal, a drain of said pumping capacitor is connected to said second control signal, and the gate of said pumping capacitor is connected to said node, and wherein a source of said pumping transistor is connected to said output, and a drain of said pumping transistor is connected to said node.

15. A memory device, comprising:

a memory array having a plurality of memory cells;

a plurality of peripheral devices for reading data out of and writing data into said memory array; and a voltage pump, said voltage pump comprising:

a charging transistor responsive to a first control signal, said charging transistor operable to connect a node to a first voltage;

a pumping capacitor responsive to a second control signal, said pumping capacitor operable to pump additional charge to said node;

a pumping transistor responsive to a third control signal, said pumping transistor operable to connect said node to an output;

a precharging transistor responsive to said first control signal to connect another node to said first voltage, wherein the conductivity of said pumping transistor is responsive to said voltage on said another node;

a start-up transistor operable to prevent said another node from exceeding the voltage of said start-up transistor by more than a threshold voltage;

a capacitor responsive to said third control signal to connect said another node to a second voltage;

an isolation transistor operable to disconnect said pumping transistor from said output; and wherein said charging transistor, said pumping capacitor, said pumping transistor, said precharging transistor, said start-up transistor, and said capacitor are thin-gate transistors.

16. The memory device of claim 15 wherein said voltage pump further comprises one or more well-switching transistors operable to switch a well connection of said pumping transistor.

17. The memory device of claim 16 wherein said one or more well-switching transistors are thin-gate transistors.

18. The memory device of claim 15 wherein at least one of said charging transistor, said pumping capacitor, said pumping transistor, said precharging transistor, said start-up transistor, or said capacitor is a p-channel type transistor having an $n^+$ doped well connection region connected to $V_{SS}$.

19. The memory device of claim 15 wherein at least one of said charging transistor, said pumping capacitor, said pumping transistor, said precharging transistor, said start-up transistor, or said capacitor is a n-channel type transistor having a switched $p^+$ doped well connection region.

20. The memory device of claim 15 wherein at least one of said charging transistor, said pumping capacitor, said pumping transistor, said precharging transistor, said start-up transistor, or said capacitor is a n-channel type transistor having an deep n-well connected to $V_{CC}$ and a switched $p^+$ doped well connection region.

* * * * *